(12) United States Patent
Kanzaki

(10) Patent No.: US 11,125,142 B2
(45) Date of Patent: Sep. 21, 2021

(54) VALVE DEVICE AND COOLING SYSTEM

(71) Applicant: DENSO CORPORATION, Kariya (JP)

(72) Inventor: Shogo Kanzaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/745,785

(22) Filed: Jan. 17, 2020

(65) Prior Publication Data

US 2020/0149462 A1 May 14, 2020

Related U.S. Application Data

(63) Continuation of application No. PCT/JP2018/027006, filed on Jul. 19, 2018.

(30) Foreign Application Priority Data

Jul. 24, 2017 (JP) .............................. JP2017-142759

(51) Int. Cl.
*F01P 7/14* (2006.01)
*F16K 31/04* (2006.01)
(Continued)

(52) U.S. Cl.
CPC .................. *F01P 7/14* (2013.01); *F01P 3/02* (2013.01); *B60K 6/24* (2013.01); *B60K 11/04* (2013.01);
(Continued)

(58) Field of Classification Search
CPC .......... F01P 2007/146; F01P 7/14; F01P 3/20; F01P 2060/045; F16K 31/041
See application file for complete search history.

(56) References Cited

U.S. PATENT DOCUMENTS 7,168,397 B2 1/2007 Chanfreau et al.
2012/0085952 A1\* 4/2012 Hauk .................... F16K 31/045
251/129.11
(Continued)

FOREIGN PATENT DOCUMENTS

JP 1-277617 11/1989
JP 2003-320854 11/2003
(Continued)

OTHER PUBLICATIONS

U.S. Appl. No. 16/710,315 to Tsuji, filed Dec. 11, 2019 (149 pages).
(Continued)

*Primary Examiner* — Long T Tran
(74) *Attorney, Agent, or Firm* — Nixon & Vanderhye P.C.

(57) ABSTRACT

A cooling water control valve controls a flow amount of a cooling medium of an engine, and includes a housing and a valve body. The housing includes output ports. The valve body is enabled to rotate about a central axis in the housing and includes openings. The openings are located at different positions in an axial direction and configured to communicate to the output ports, respectively. The valve body changes a communication degree between the opening and the output port according to a rotational position. The cooling water control valve is placed such that an axial direction of the valve body is substantially orthogonal to an axial direction of a crankshaft of the engine.

20 Claims, 14 Drawing Sheets

(51) Int. Cl.
*F01P 3/02* (2006.01)
*B60K 6/24* (2007.10)
*B60K 11/04* (2006.01)

(52) U.S. Cl.
CPC ..... *B60Y 2200/92* (2013.01); *F01P 2003/021* (2013.01); *F01P 2007/146* (2013.01); *F01P 2050/24* (2013.01)

(56) References Cited

U.S. PATENT DOCUMENTS

| | | | | |
|---|---|---|---|---|
| 2014/0007824 | A1* | 1/2014 | Hayashi | F01P 7/167 123/41.01 |
| 2014/0069522 | A1* | 3/2014 | Kuze | F01P 7/14 137/334 |
| 2015/0027572 | A1* | 1/2015 | Morein | F16K 41/026 137/625.19 |
| 2015/0027575 | A1* | 1/2015 | Morein | F01P 7/14 137/865 |
| 2016/0218602 | A1 | 7/2016 | Fukushima et al. | |
| 2017/0030274 | A1* | 2/2017 | Nakanishi | F01P 11/16 |
| 2018/0195780 | A1* | 7/2018 | Itou | B60H 1/32281 |
| 2019/0211738 | A1* | 7/2019 | Yoshimura | F16K 5/04 |
| 2019/0242662 | A1* | 8/2019 | Goto | F28F 27/02 |

FOREIGN PATENT DOCUMENTS

| | | |
|---|---|---|
| JP | 2004-92597 | 3/2004 |
| JP | 2011-202585 | 10/2011 |
| JP | 2016-196931 | 11/2016 |
| WO | 2018/230658 | 12/2018 |
| WO | 2018/230664 | 12/2018 |

OTHER PUBLICATIONS

U.S. Appl. No. 16/711,779 to Kanzaki, filed Dec. 12, 2019 (148 pages).

* cited by examiner

VALVE DEVICE AND COOLING SYSTEM

CROSS REFERENCE TO RELATED APPLICATION

The present application is a continuation application of International Patent Application No. PCT/JP2018/027006 filed on Jul. 19, 2018, which designated the U.S. and claims the benefit of priority from Japanese Patent Application No. 2017-142759 filed on Jul. 24, 2017. The entire disclosures of all of the above applications are incorporated herein by reference.

TECHNICAL FIELD

The present disclosure relates to a valve device and a cooling system including the valve device.

BACKGROUND

A known valve device includes a housing and a valve body and communicates a port of the housing to an interior of the housing according to a rotational position of the valve body.

SUMMARY

A valve device according to an aspect of the present disclosure controls a flow amount of a cooling medium of an engine, and includes a housing and a valve body. The valve device is placed such that an axial direction of the valve body is substantially orthogonal to an axial direction of a driving shaft of the engine.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
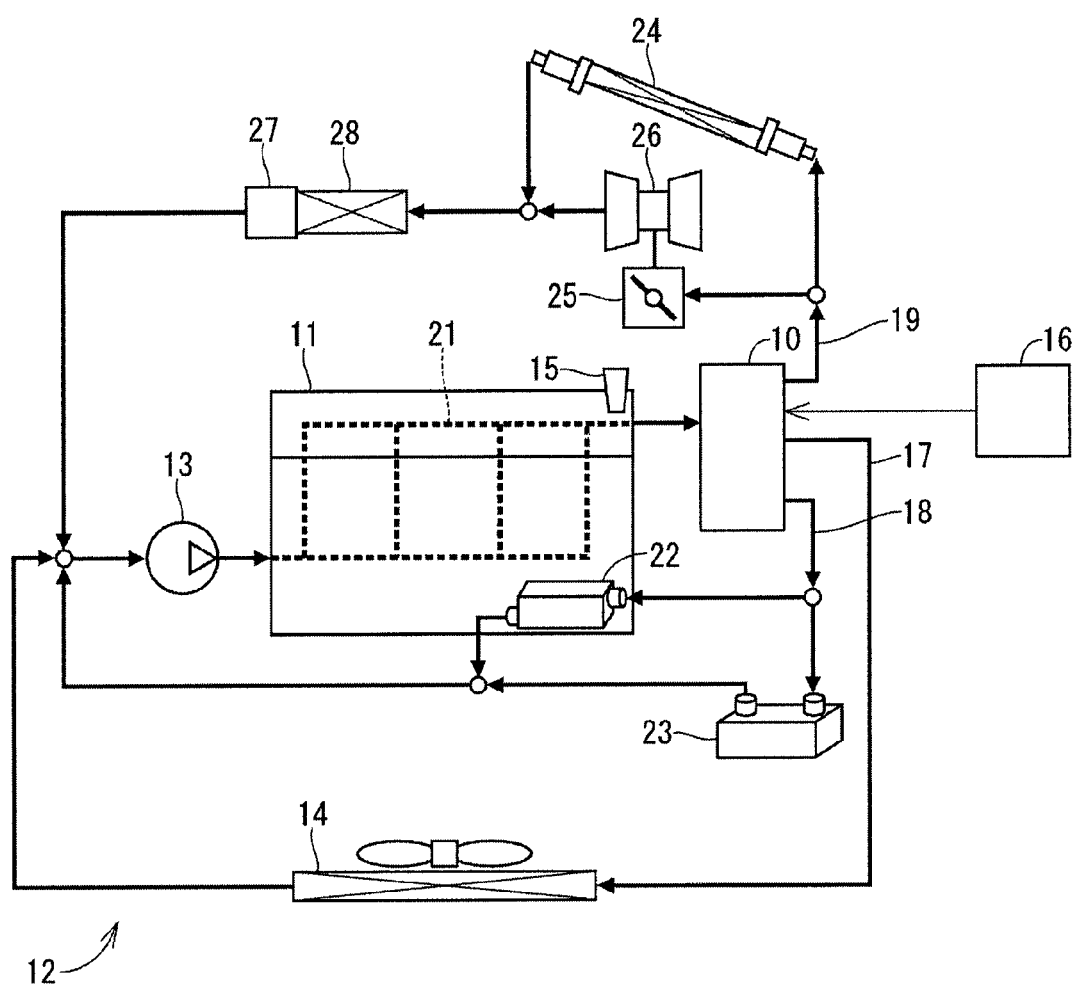
FIG. 1 is a schematic view showing a cooling system to which a cooling water control valve device according to a first embodiment is applied.

Hereinafter, one example of the present disclosure will be described.

According to the one example, a housing includes multiple ports and a valve body that includes multiple openings. The openings are located at positions which are different from those of other openings in an axial direction and configured to communicate to the multiple ports, respectively. The valve body changes a communication degree between the opening and the port corresponding to a rotational position.

A valve device is located with an engine in an engine room of a vehicle. For example, an air cleaner, a battery or the like are placed around the engine in addition to an auxiliary equipment which is provided to the engine, a transmission, an intake manifold, an exhaust manifold, and the like. On a hybrid vehicle, a power converter which controls a current flowing from a battery to a motor for driving the vehicle, and the like may be located around an engine.

Therefore, a small space remains around the engine. One issue may arise that how the valve device is located in a small space.

The valve device according to one example of the present disclosure is configured to control a flow amount of a cooling medium of an engine and includes a housing and a valve body. The housing includes multiple ports. The valve body is enabled to rotate about a central axis in the housing and includes multiple openings which are located at different positions in an axial direction and configured to communicate the multiple ports, respectively. The valve body changes a communication degree between the openings and the ports according to a rotational position. The valve device is placed such that an axial direction of the valve body is substantially orthogonal to an axial direction of a driving shaft of the engine.

The arrangement as above enables the valve device to be placed in the engine room with a space smaller than the case in which the valve body is arranged in the same direction as the driving shaft of the engine. The "substantially orthogonal" in the above means that the axial direction of the valve body intersects the axial direction of the driving shaft of the engine at an intersection angle between 80° and 100°. In this way, the valve device according to the example of the present disclosure could be placed in a small space. In addition, a cooling system according to the example of the present disclosure includes the valve device.

An embodiment will be described with reference to drawings as follows. The same reference numerals between the embodiments are given to the same structures in order to eliminate explanation.

First Embodiment

FIG. 1 shows a cooling water control valve as a valve device according to a first embodiment. A cooling water control valve 10 is applied to a cooling system 12 including an engine 11 for a vehicle.

<Cooling System>

First, the cooling system 12 will be described below. As shown in FIG. 1, the cooling system 12 includes the engine 11, a water pump 13, the cooling water control valve 10, a radiator 14, a water temperature sensor 15, an electronic control device 16, and the like. The water pump 13 is provided at a place in which multiple circulation routes 17, 18, 19 are gathered. The water pump 13 compresses and sends cooling water as a cooling medium toward a water jacket 21 of the engine 11. The cooling water control valve 10 is placed at a point, at which the circulation routes 17, 18, 19 are branched, such as an outlet of the water jacket 21. The cooling water control valve 10 controls flow amounts of cooling water flowing in the circulation routes 17, 18, 19.

The radiator 14 is a heat exchanger which is provided at an intermediate location of the circulation route 17 and decreases a temperature of cooling water by exchanging heat between cooling water and air. An engine oil cooler 22 and a transmission oil cooler 23 are provided at an intermediate location of the circulation route 18. A heater core 24, a throttle valve 25, a super charger 26, an EGR valve 27, and an EGR cooler 28 are provided at an intermediate location of the circulation route 19.

The water temperature sensor 15 is provided before the cooling water control valve 10. The electronic control device 16 manipulates the cooling water control valve 10 in accordance with water temperature which is detected by the water temperature sensor 15 and controls the flow amounts of cooling water flowing in the circulation routes 17, 18, 19.

<Cooling Water Control Valve>

Figure 2:
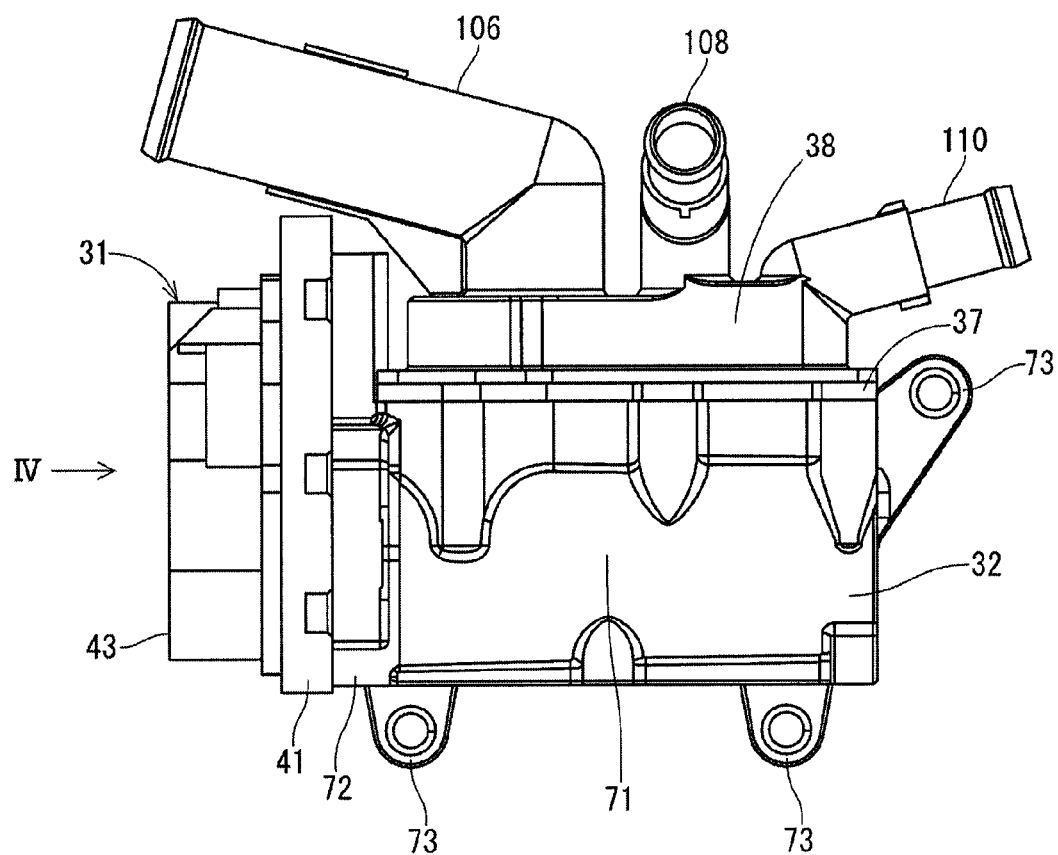
FIG. 2 is an outline view showing the cooling water control valve.
Figure 3:
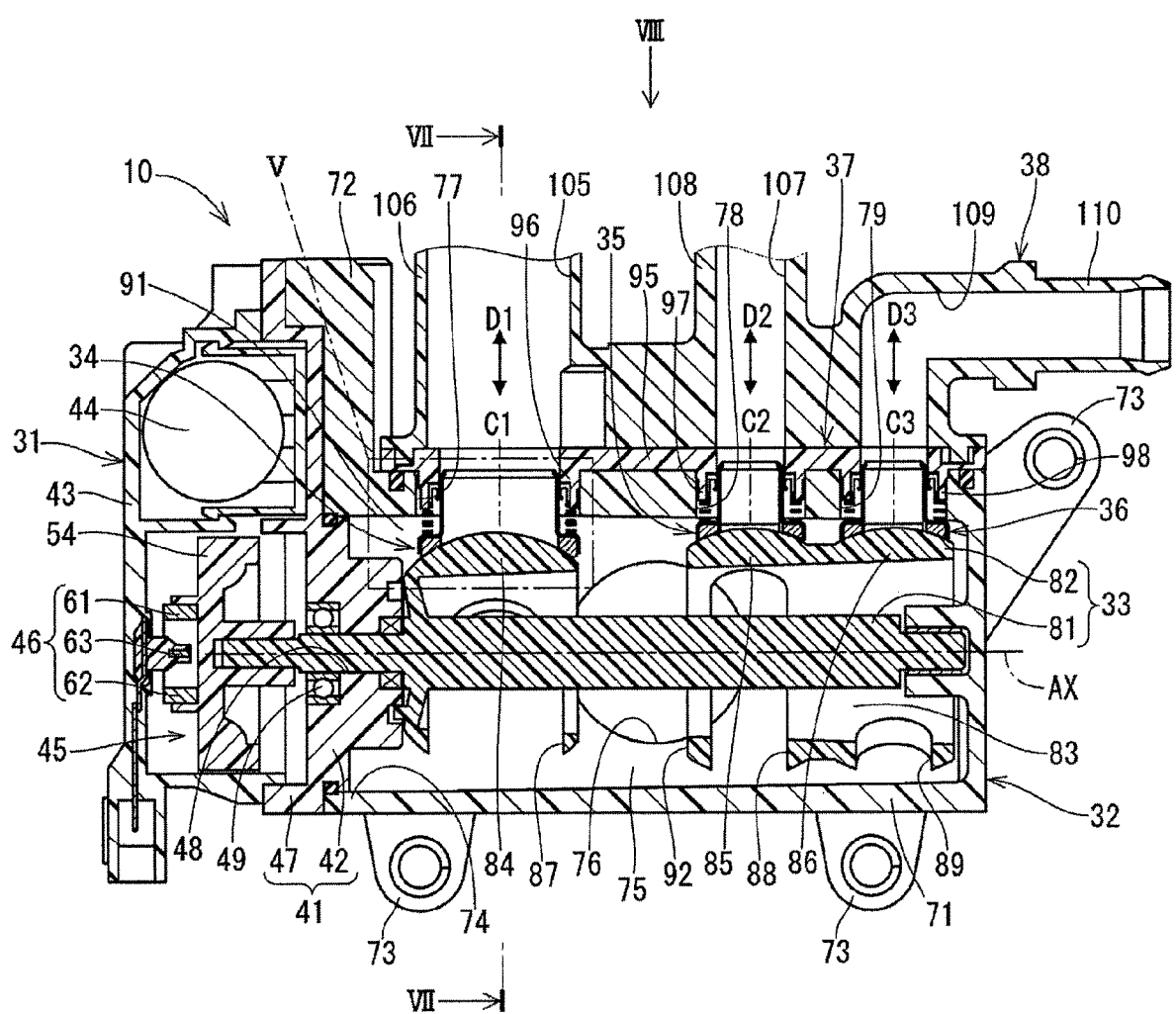
FIG. 3 is a longitudinal sectional view showing the cooling water control valve taken along an axis of the valve body when a communication degree of the opening of the valve body is 0%.

The cooling water control valve 10 will be described below. As shown in FIGS. 2 and 3, the cooling water control valve 10 includes a driving unit 31, a housing 32, a valve body 33, a seal unit 34, 35, 36, a holding plate 37, and a pipe member 38.

Figure 4:
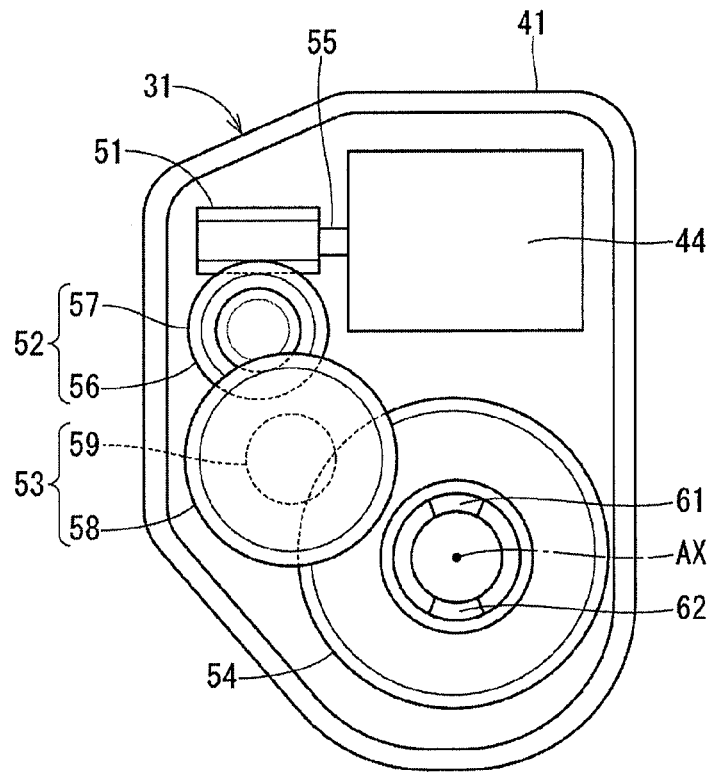
FIG. 4 is a view showing the cooling water control valve viewed in a IV direction in FIG. 2 when a cover for a driving unit is removed.

As shown in FIGS. 3 and 4, the driving unit 31 includes a case 41, a cover 43 which forms a housing space with the case 41, a motor 44, and a reduction gear 45 which are located in the housing space, and a rotation angle sensor 46. The case 41 includes a base 47 having a base form, and a connection fitting portion 42 fitting in a connection opening 74 of the housing 32. A shaft insertion hole 48 and a bearing 49 are provided in the center of the connection fitting portion 42. One end of a shaft 81 of the valve body 33 is inserted into the shaft insertion hole 48. The bearing 49 supports the one end of the shaft 81.

The reduction gear 45 includes a cylindrical gear 51, a first gear 52, a second gear 53, and a third gear 54. The cylindrical gear is fixed to an output shaft 55 of the motor 44. The first gear 52 includes a first large diameter gear 56 which is mashed with the cylindrical gear 51 and a first small diameter gear 57 which has a diameter smaller than that of the large diameter gear 56. The second gear 53 includes a second large diameter gear 58 which is mashed with the first small diameter gear 57 and a second small diameter gear 59 which has a diameter smaller than that of the second large diameter gear 58. The third gear 54 is mashed with the second small diameter gear 59 and fixed to the one end of the shaft 81 of the valve body 33. The reduction gear 45 reduces rotation speed of power of the motor 44 and outputs the power.

The rotation angle sensor 46 includes magnets 61, 62 which are provided to the third gear 54 and a magnetic detection part 63 which is provided between the magnets 61, 62 and positioned on the central axis AX of the valve body 33. The magnetic detection part 63 includes a hall IC or the like and detects a rotation angle of the valve body 33 by detecting a magnetic field which changes with rotation of the valve body 33.

As shown in FIGS. 2 and 3, the housing 32 includes a housing main body 71 which has a tubular form and includes an internal space 75, a fixing flange 73 for fixture to the engine 11, and an installing flange 72 for installing the driving unit 31. A connection opening 74 is formed at one end of the housing main body 71. The housing main body 71 includes an input port 76 and multiple output ports 77, 78, 79 which connect the internal space 75 to an outside, that is, exterior to the housing 32. According to the first embodiment, the input port 76 and the output ports 77, 78, 79 penetrate the lateral side of the housing main body 71, that is, a tubular part in a radial direction.

The valve body 33 is enabled to rotate about the central axis AX in the internal space 75. Correspondingly to a rotational position of the valve body 33, the input port 76 is communicated selectively with the output ports 77, 78, 79, or the valve body 33 closes passages between the input port 76 and the output ports 77, 78, 79. The valve body 33 includes the shaft 81 and a cylinder part 82 which is provided at the outside of the shaft 81. The shaft 81 is supported by the bearing 49 and the end side of the housing main body 71 and is enabled to rotate. The cylinder part 82 is connected to the shaft 81 at the one side in an axial direction. The shaft 81 and the cylinder part 82 are one component. A valve body inside passage 83 is formed between the cylinder part 82 and the shaft 81.

The cylinder part 82 includes annular portions 84, 85, 86 which are equipped in this order in the axial direction. The annular portion 84 is placed at the axial location same as the output port 77. The annular portion 85 is placed at the axial location same as the output port 78 and connected to the annular portion 84 with an unillustrated connection. The annular portion 86 is placed at the axial location same as the output port 79 and connected to the annular portion 85. Exterior walls of each of the annular portions 84, 85, 86 have a sphere shape.

The cylinder part 82 includes openings 87, 88, 89 and an opening 92. The openings 87, 88, 89 respectively connect the output ports 77, 78, 79 to the valve body inside passage 83 correspondingly to the rotational position of the valve body 33. The opening 92 connects the inlet port 76 to the valve body inside passage 83 through an outside of the valve body 33 in the internal space 75, which is referred to as a valve body outer space 91 hereinafter, regardless of the rotational position of the valve body 33. The openings 87, 88, 89 are located at different positions in the axial direction and configured to communicate to the output ports 77, 78, 79, respectively. The opening 87 is formed in the annular portion 84 and enabled to connect the output port 77 to the valve body inside passage 83. The opening 88 is formed in the annular portion 85 and enabled to connect the output port 78 to the valve body inside passage 83. The opening 89 is formed in the annular portion 86 and enabled to connect the output port 79 to the valve body inside passage 83. The opening 92 is formed between the annular portion 84 and the annular portion 85.

The holding plate 37 is a holding member holding seal units 34, 35, 36 and includes a plate 95 and holders 96, 97, 98. The plate 95 has a plate form and is fixed to the housing main body 71. The holders 96, 97, 98 are annular protrusions protruding from the plate 95 into the output ports 77 78, 79, respectively.

Figure 5:
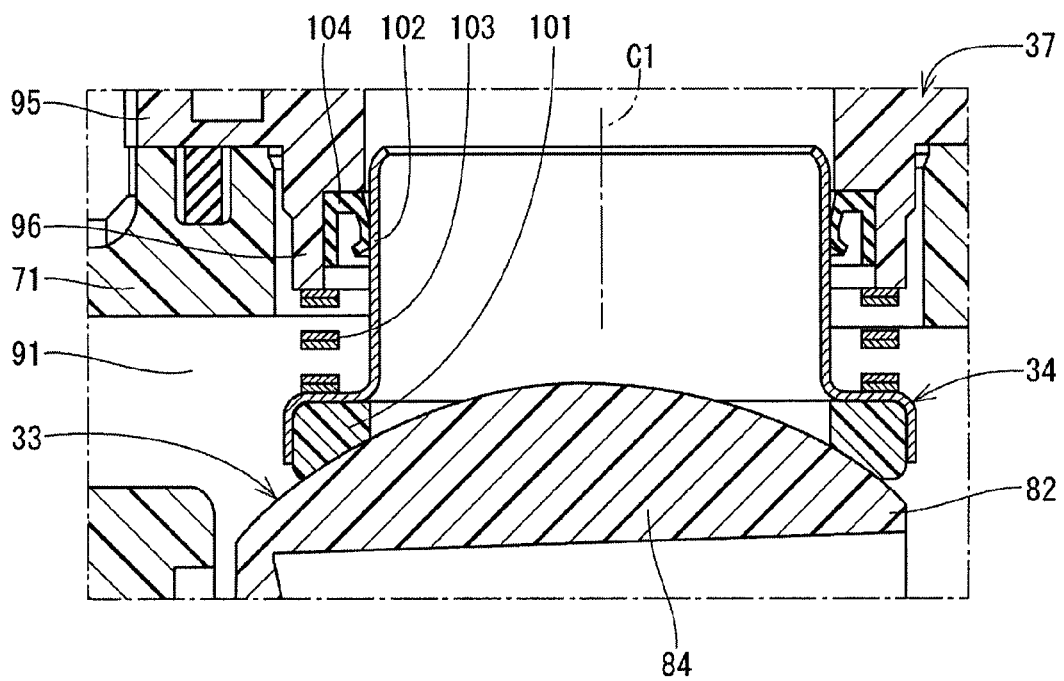
FIG. 5 is an enlarged view showing a V part shown in FIG. 3.

The seal units 34, 35, 36 are provided correspondingly to the output ports 77, 78, 79, respectively. As shown in FIGS. 3 and 5, the seal unit 34 includes a valve seal 101, a sleeve 102, a spring 103, and a seal member 104. The valve seal 101 is an annular seal member abutting against the exterior wall of the annular portion 84 of the valve body 33. The sleeve 102 is a tubular member and extends from the output port 77 toward the valve body outer space 91, and includes the valve seal 101. The spring 103 biases the sleeve 102 toward the annular portion 84. The seal member 104 seals between the holder 96 of the holding plate 37 and the sleeve 102.

The seal unit 34 seals between the output port 77 and the valve body outer space 91. When the valve body 33 rotates, the annular portion 84 slides on the valve seal 101 thereby to cause the seal unit 34 to maintain the sealing state. The seal unit 35 includes a valve seal, a sleeve, a spring, and a seal member, similar to those of the seal unit 34, and seals between the output port 78 and the valve body outer space 91.

The seal unit 36 includes a valve seal, a sleeve, a spring, and a seal member, similar to those of the seal unit 34, and seals between the output port 79 and the valve body outer space 91. As shown in FIGS. 2 and 3, the pipe member 38 includes a pipe 106 including a passage 105 which is connected to the output port 77, a pipe 108 including a passage 107 which is connected to the output port 78, and a pipe 110 including a passage 109 which is connected to the output port 79.

As shown in FIGS. 1 to 3, according to the first embodiment, the input port 76 is connected to the outlet of the water jacket 21. The pipe 106 is connected to the circulation route 17. The pipe 108 is connected to the circulation route 18. The pipe 110 is connected to the circulation route 19. In the cooling water control valve which is configured as above, cooling water removes a heat from the engine 11 while flowing in the water jacket 21, and a temperature of cooling water rises. Cooling water flows into the valve body outer space 91 through the input port 76. Cooling water in the valve body outer space 91 flows into the valve body inside passage 83 through the opening 92 of the valve body 33. Cooling water in the valve body inside passage 83 is distributed to the pipes 106, 108, 110 correspondingly to communication degrees between the openings 87, 88, 89 of the valve body 33 and the output ports 77, 78, 79, respectively.

Figure 6:
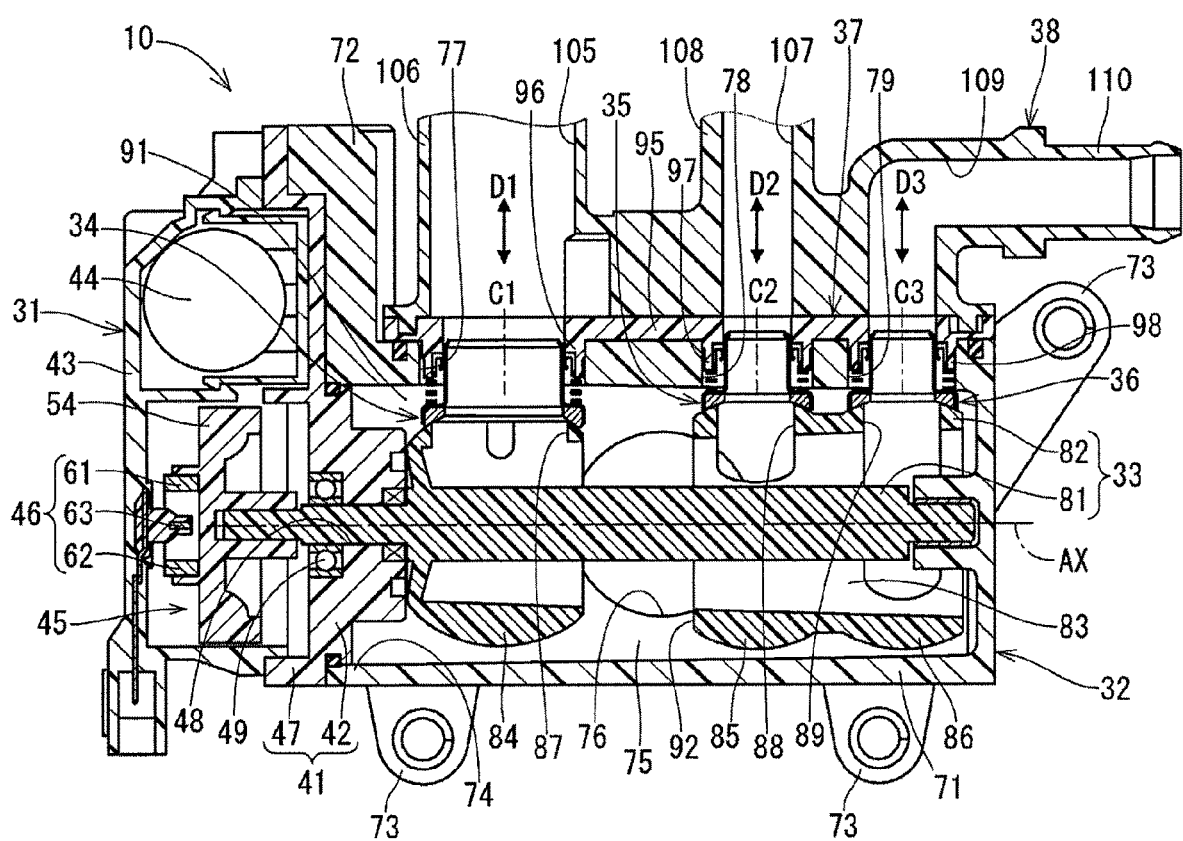
FIG. 6 is a longitudinal sectional view showing the cooling water taken along the axis of the valve body when the communication degree of the opening of the valve body is 100%.

The above communication degrees change corresponding to the rotational position of the valve body 33. That is, the valve body 33 changes the communication degrees between the openings 87, 88, 89 and the output ports 77, 78, 79 correspondingly to the rotational position. For example, in FIG. 3, the communication degrees of the openings 87, 88, 89 are all 0%. On the other hand, in FIG. 6, the communication degrees of the openings 87, 88, 89 are all 100%. The cooling water control valve 10 changes the communication degrees of the openings 87, 88, 89 in a range from 0% to 100% by changing the rotational position of the valve body 33 between the situation shown in FIG. 3 and the situation shown in FIG. 6. Therefore, the water control valve 10 controls the flow amounts of cooling water in the circulation routes 17, 18, 19.

<Ports and Surroundings>

Figure 7:
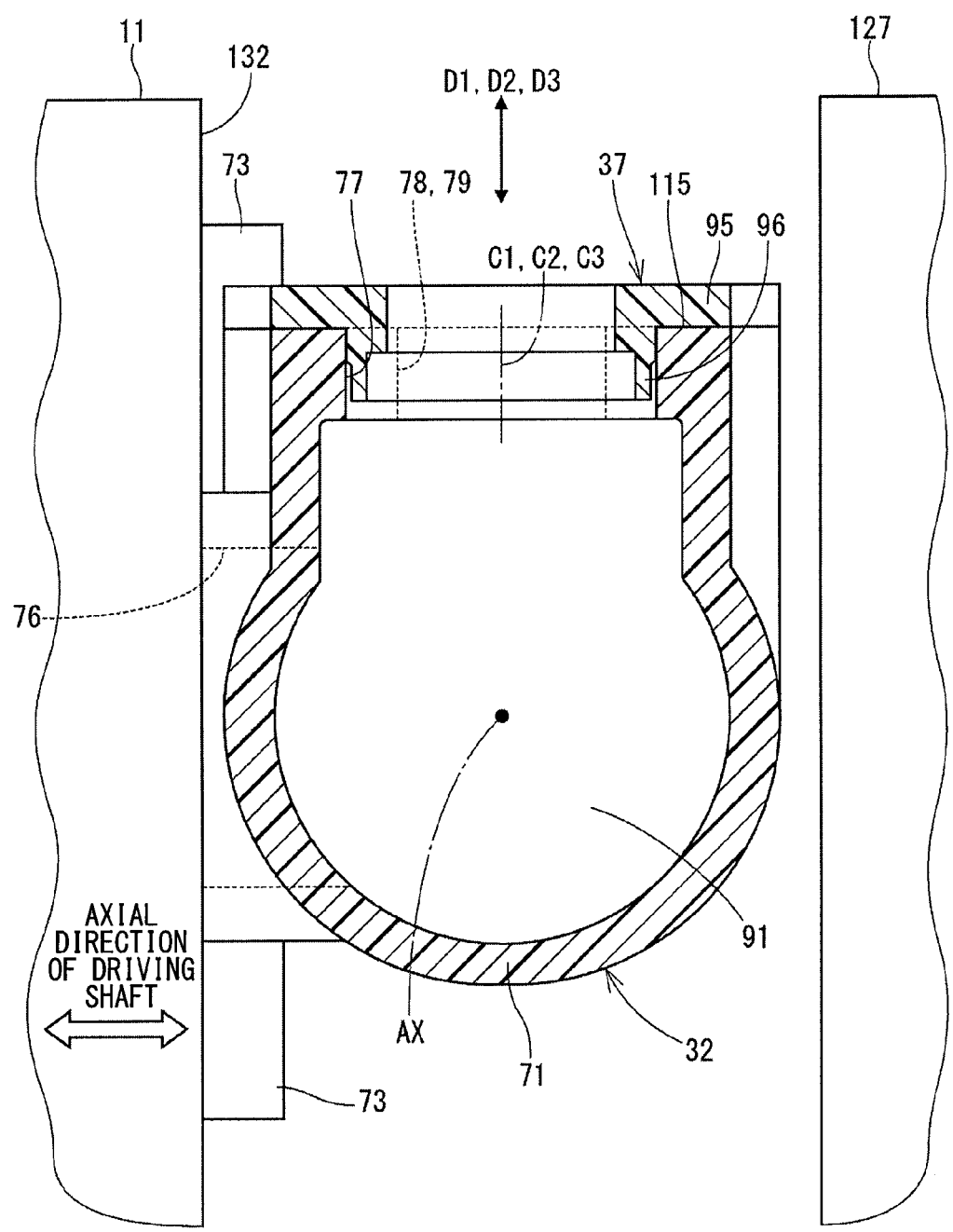
FIG. 7 is a sectional view taken along a VII-VII line in FIG. 3 and showing the housing and a holding plate.

Ports and their surroundings will be described in more detail as follows. As shown in FIG. 7, the input port 76 penetrates the housing 32 on the side at which the housing 32 is attached to the engine 11 that is, the side in which the fixing flange 73 is provided. The housing 32 is attached to the engine 11 and the input port 76 is brought into connect to the outlet of the water jacket 21, referring to FIG. 1. Therefore, a pipe line for connecting the input port 76 to the water jacket 21 is not required.

As shown in FIG. 7, any one of the output ports 77, 78, 79 is overlapped at least partially with at least one of another output ports 77, 78, 79 in a circumferential direction when viewed in the axial direction, that is, a direction parallel to the central axis AX. That is, at least a part of one output port is overlapped with all of other output ports when viewed in the axial direction. For example, in a case where the "one output port" is the output port 77, at least a part of the output port 77 is overlapped with the output ports 78, 79 when viewed in the axial direction. In other words, as shown in FIG. 3, all of output ports 77, 78, 79 reside on the cross section including the central axis AX.

Figure 8:
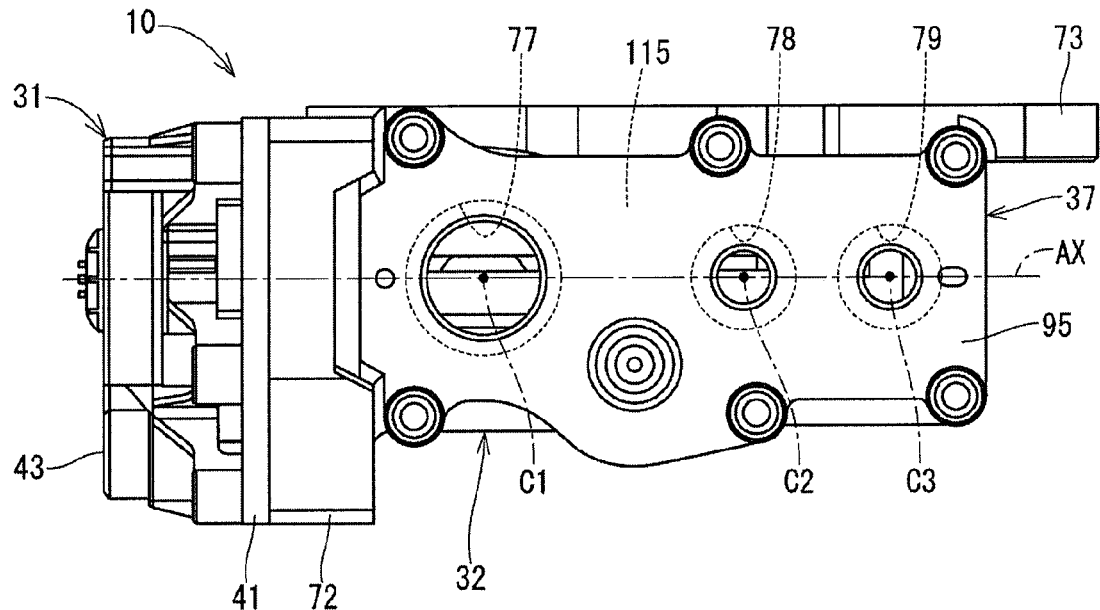
FIG. 8 is a view showing the cooling water control valve viewed in a VIII direction in FIG. 3 when the pipe member is removed.

In the first embodiment, as shown in FIG. 7 when viewed in the axial direction, central axes C1, C2, C3 of the output ports 77, 78, 79 are at same circumferential position. As shown in FIGS. 7 and 8, the output ports 77, 78, 79 are provided on a side 115 of the housing 32. As shown in FIG. 8, the output ports 77, 78, 79 are arranged on a straight line. This enables to concentrate the output port 77, 78, 79 on one part of the housing 32 in a rotating direction of the valve body 33. Therefore, at least roots of the pipes 106, 108, 110 which are connected to the output ports 77, 78, 79, respectively, are enabled to be housed within the width of the housing 32. In this way, the cooling water control valve 10 is enabled to be thinner.

As shown in FIGS. 3 and 7, opening directions D1, D2, D3 of the output ports 77, 78, 79, that is, a direction along the central axes C1, C2, C3, are parallel to each other. The side 115 is a flat plane and the opening directions D1, D2, D3 are perpendicular to the side 115. This enables the seal units 34, 35, 36 and the pipes 106, 108, 110 to be assembled without rotating the housing 32. In addition, the constructing work is facilitated because the seal units 34, 35, 36 are assembled from one direction. In addition, all of the seal units 34, 35, 36 are enabled to be assembled at same time.

As shown in FIG. 3, the holding plate 37 holds all of the seal units 34, 35, 36 altogether. Therefore, the seal units 34, 35, 36 and the holding plate 37 can be constructed into a sub-assembly in advance, and the sub-assembly can be attached to the housing 32. In this way, the working efficiency can be enhanced.

The holding plate 37 is a member different from the pipe member 38. Therefore, the seal units 34, 35, 36 are held on the housing 32 even when the pipe member 38 is removed. The cooling water control valve 10 in the first embodiment is enabled to have the same shape, in a state where the pipe member 38 is removed, with respect to another cooling water control valve which includes a pipe member which is different from the pipe member 38. This facilitates a leakage inspection for the seal units 34, 35, 36. For example, an automation of the operation of a leakage inspection is facilitated.

The pipe member 38 is integrally formed with all of the pipes 106, 108, 110. This enables all of the pipes 106, 108, 110 to be assembled with one operation. In this way, the working efficiency can be enhanced.

<Arrangement of the Cooling System Components>

Figure 9:
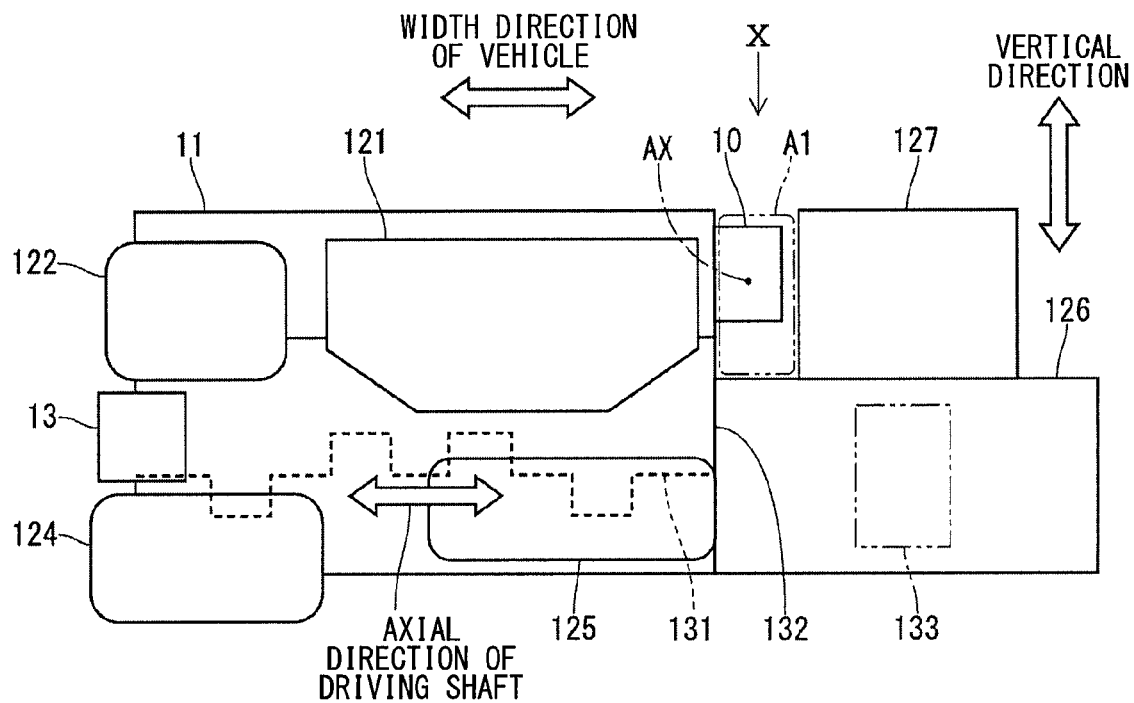
FIG. 9 is a schematic view showing the engine and a peripheral equipment shown in FIG. 1 viewed from the front of the vehicle.

The arrangement of components of the cooling system 12 will be described in more detail as follows. As shown in FIG. 9, the engine 11 is placed such that an axial direction of a crankshaft 131, which is a driving shaft and referred to as a drive shaft direction hereinafter, is substantially parallel to a width direction of the vehicle, which is referred to as a vehicle width direction hereinafter. That is, the engine 11 is a transverse engine. The engine 11 is assembled with an intake manifold 121, an alternator 122, the water pump 13, a compressor 124, a starter 125, a transmission 126, and the like.

The transmission 126 is assembled on a lower portion of a side wall 132 of the engine 11. A motor 133 is provided in the transmission 126. The motor 133 functions as a power source of the vehicle with the engine 11. A power converter 127 is provided to the upper side of the transmission 126. The power converter 127 controls a current flowing from an unillustrated battery to the motor 133 and includes an inverter and the like. The power converter 127 is provided at a location to be opposed to the upper part of the side wall 132 of the engine 11 in the drive shaft direction.

Figure 10:
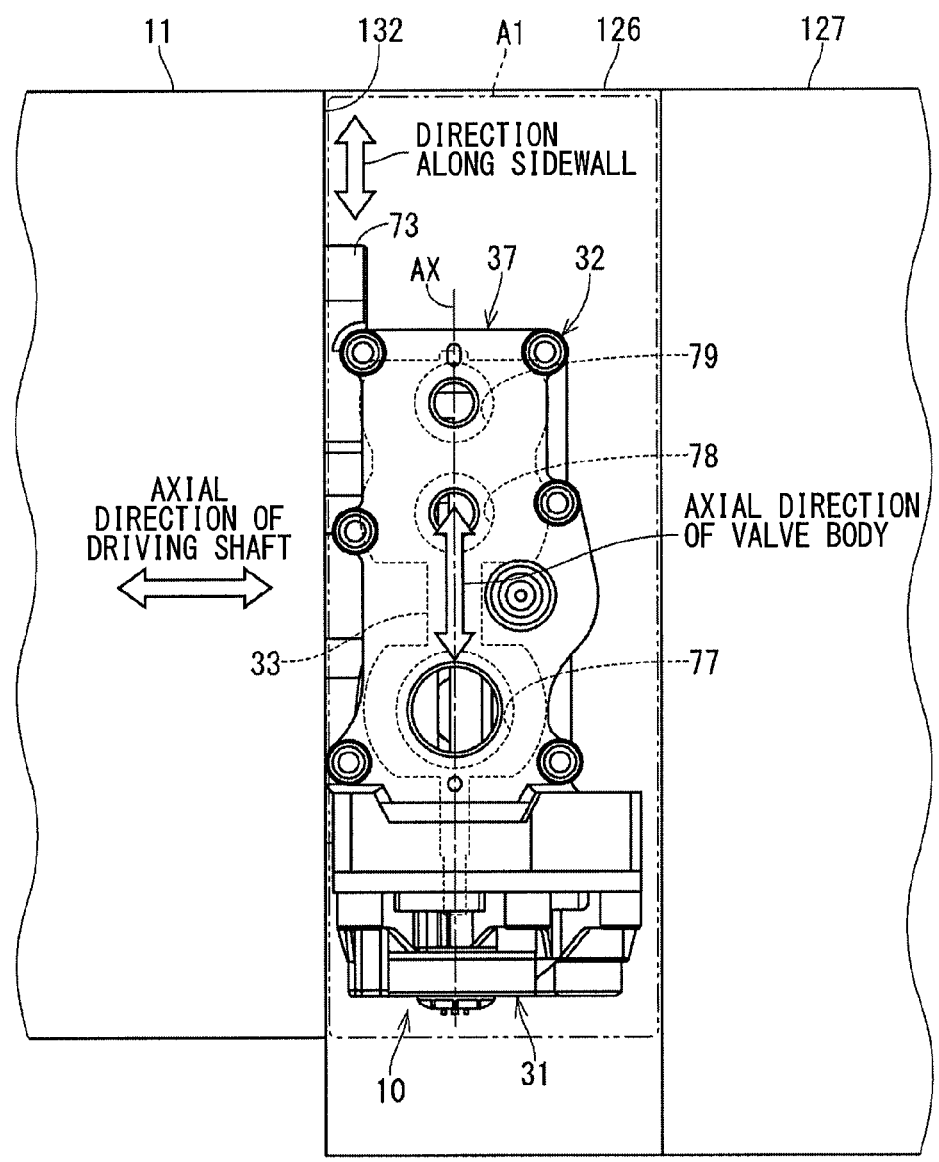
FIG. 10 is a view showing the cooling control valve, the engine, a power converter, and a transmission viewed along an X direction in FIG. 9.

As shown in FIGS. 9 and 10, it is required to place the engine 11 and the like in the limited space in an engine room, and the power converter 127 is placed closer to the engine 11. Therefore, a small space A1 is formed between the engine 11 and the power converter 127. The small space A1 is a space in which a distance between the engine 11 and the power converter 127 in a direction where the engine 11 is opposed to the power converter 127 is smaller than a length in a direction along the side facing to the engine 11, that is, the side wall 132. The "direction where the engine 11 is opposed to the power converter 127" in above is parallel to the vehicle width direction. The engine 11 is the transverse engine and the width of the transverse engine in the vehicle width direction is more restricted than that of the longitudinal engine. Therefore, a space in the vehicle width direction tends to be smaller.

The cooling water control valve 10 is placed such that an axial direction of the valve body 33, which is referred to as a valve body shaft direction hereinafter, is substantially orthogonal to the drive shaft direction. This enables the cooling water control valve 10 to be placed in the small space A1. The "substantially orthogonal" in the above means that the valve body shaft direction intersects the drive shaft direction at an intersection angles between 80° and 100°. The housing 32 has a tubular form and its width in a radial direction is smaller than its length in an axial direction. The cooling water control valve 10 is placed such that the radical direction of the housing 32 coincides with the direction in which the engine 11 is opposed to the power converter 127. In other words, the cooling water control valve 10 is placed such that the axial direction of the valve body 33, that is, the valve body shaft direction coincides with a direction along the side wall 132 of the engine.

As shown in FIG. 7, the output ports 77, 78, 79 are concentrated on one part of the housing 32 in the rotating direction of the valve body 33. The one part is equipped with the seal units 34, 35, 36, the holding plate 37, and the pipe member 38. Therefore, each of the housing 32 and the cooling water control valve 10 has is relatively large in the opening direction D1 and relatively small in a direction orthogonal to the opening direction D1, even in the same radial direction. The cooling water control valve 10 is placed such that the above "direction orthogonal to the opening direction D1" is same as the direction in which the engine 11 is opposed to the power converter 127.

As shown in FIG. 10, the cooling water control valve 10 is placed to overlap the transmission 126 when viewed in a vertical direction. That is, the cooling water control valve 10 is placed such that a projection of the cooling water control valve 10 in the vertical direction overlaps a projection of the transmission 126 in the vertical direction.

<Effect>

As described above, in the first embodiment, the cooling water control valve 10 controls a flow amount of cooling water in the engine 11 and includes the housing 32 and the valve body 33. The housing 32 includes the multiple output ports 77, 78, 79. The valve body 33 is enabled to rotate about the central axis AX in the housing 32 and includes the openings 87, 88, 89. The openings 87, 88, 89 are located at different positions in the axial direction, respectively, and configured to communicate with the output ports 77, 78, 79, respectively. The valve body 33 changes the communication degrees between the openings 87, 88, 89 and the output ports 77, 78, 79 correspondingly to the rotational position. The cooling water control valve 10 is placed such that the axial direction of the valve body 33 is substantially orthogonal to the axial direction of the crankshaft of the engine 11.

The arrangement as above enables the cooling water control valve 10 to be placed in the engine room with a space smaller than the case in which the valve body 33 is arranged in the same direction as the crankshaft 131 of the engine 11. For example, the arrangement enables the cooling water control valve to be provided instead of a part of a thermostat or coolant pipes which are conventionally attached to the engine 11.

In addition, in the first embodiment, the cooling water control valve is provided between the engine 11 and the power converter 127. Therefore, the small space A1 which is located between the engine 11 and the power converter 127 can be used effectively.

In addition, in the first embodiment, the engine 11 is placed such that the drive shaft direction is parallel to the vehicle width direction. The width of the vehicle of the transverse engine is more restrictive than that of the longitudinal engine. However, the cooling water control valve 10 is enabled to be provided in the space which is small in the vehicle width direction in the arrangement where the valve body shaft direction is substantially orthogonal to the drive shaft direction.

In addition, in the first embodiment, the cooling water control valve 10 is placed such that the projection of the cooling water control valve 10 in the vertical direction overlaps the projection of the transmission 126 in the vertical direction. The power converter 127 is provided on the upper side of the transmission 126. Therefore, only small space remains between the engine 11 and the power converter 127. Even in such a case, the cooling water control valve 10 can be placed instead of a part of the thermostat or the coolant pipes which are conventionally attached to the engine 11.

In addition, in the first embodiment, the housing 32 includes the input port 76 which guides cooling water to flow into the housing 32 from the outside, and the multiple output ports 77, 78, 79 which guide cooling water to flow to the outside from the inside of the housing 32. The cooling water control valve 10 is suitably placed on an outlet side of the water jacket 21 of the engine 11.

Second Embodiment

Figure 11:
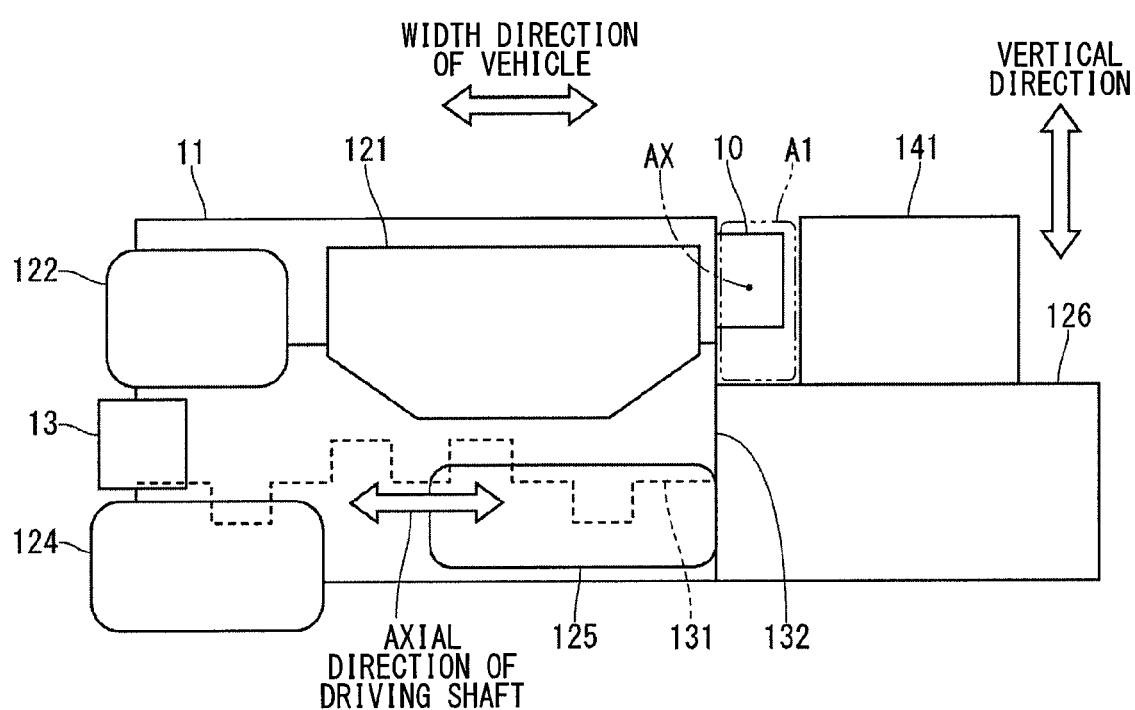
FIG. 11 is a schematic view, which corresponds to FIG. 9 according to the first embodiment, to explain the engine and the peripheral equipment to which a cooling water control valve according to a second embodiment is applied.

According to a second embodiment, as shown in FIG. 11, an air cleaner 141 is provided on the upper side of the transmission 126. The small space A1 is located between the engine 11 and the air cleaner 141. In the second embodiment, the cooling water control valve 10 is provided such that the valve body shaft direction is substantially orthogonal to the drive shaft direction. This enables the cooling water control valve 10 to be placed in the small space A1, similarly to the first embodiment. That is, the cooling water control valve 10 may be placed in the small area not only between the engine 11 and the power converter 127, but also between an equipment such as the air cleaner 141 or the like and the engine 11.

Third Embodiment

Figure 12:
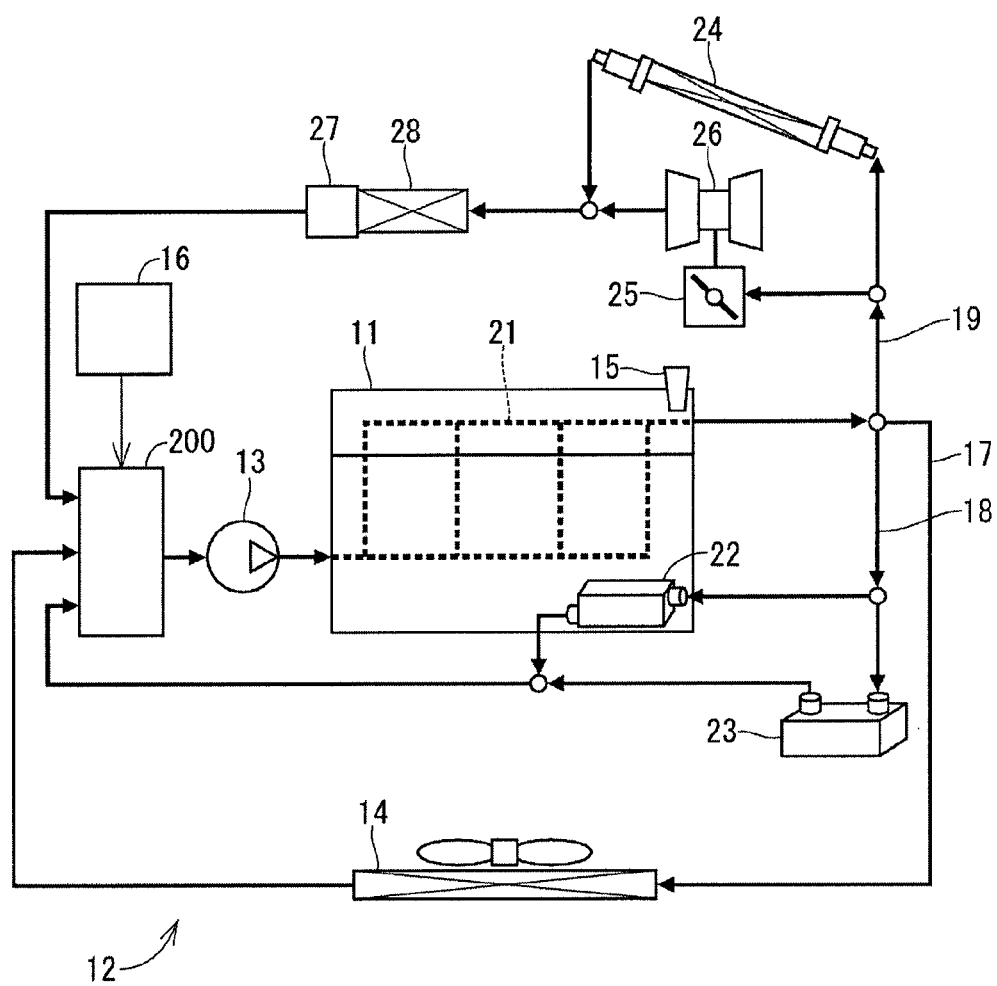
FIG. 12 is a schematic view, which corresponds to FIG. 1 according to the first embodiment, to explain the cooling system to which a cooling water control valve according to a third embodiment is applied.
Figure 13:
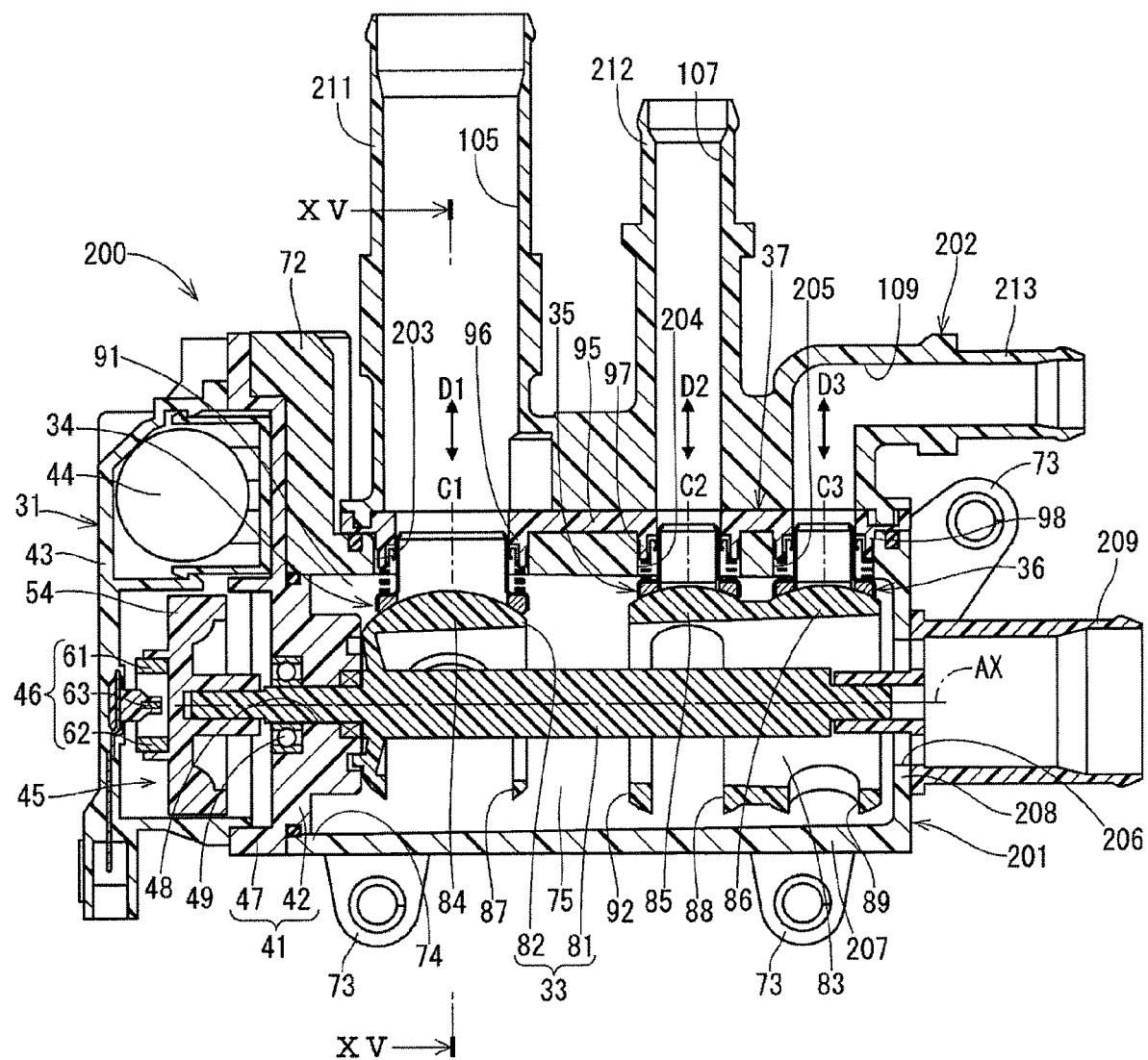
FIG. 13 is a sectional view showing the cooling water control valve shown in FIG. 12 when the communication degree of the opening of valve body is 0%.
Figure 14:
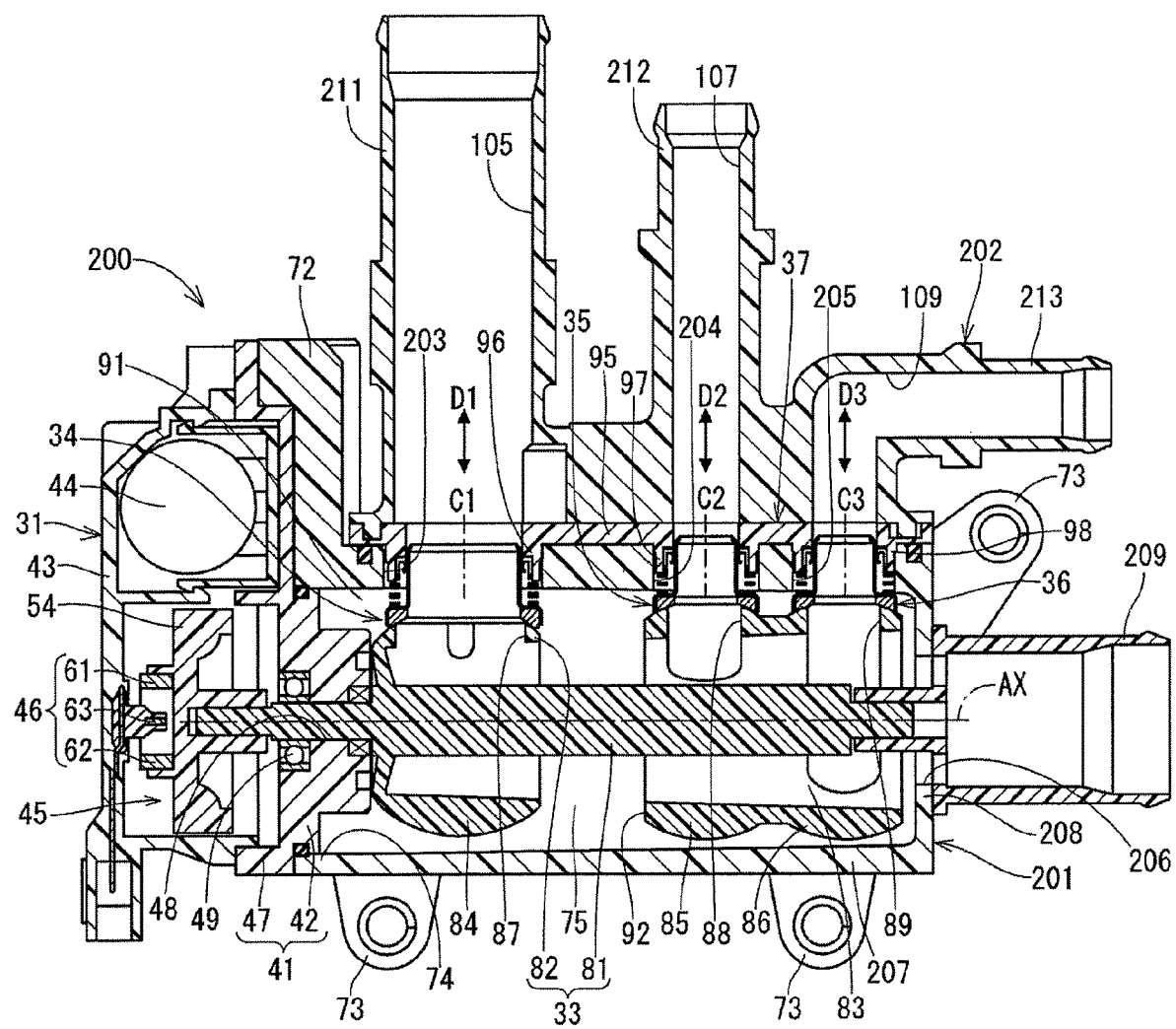
FIG. 14 is a sectional view showing the valve body that rotated until its communication degree of the opening reaches 100% from the state in FIG. 13.

According to a third embodiment, as shown in FIG. 12, a cooling water control valve 200 is placed at a place in which the circulation routes 17, 18, 19 are gathered, for example, before the water pump 13. As shown in FIGS. 13 and 14, the cooling water control valve 200 includes the driving unit 31, the valve body 33, the seal units 34, 35, 36, and the holding plate 37, similar to those in the first embodiment. The cooling water control valve 200 includes a housing 201 and a pipe member 202, instead of the housing 32 and the pipe member 38 in the first embodiment.

Figure 15:
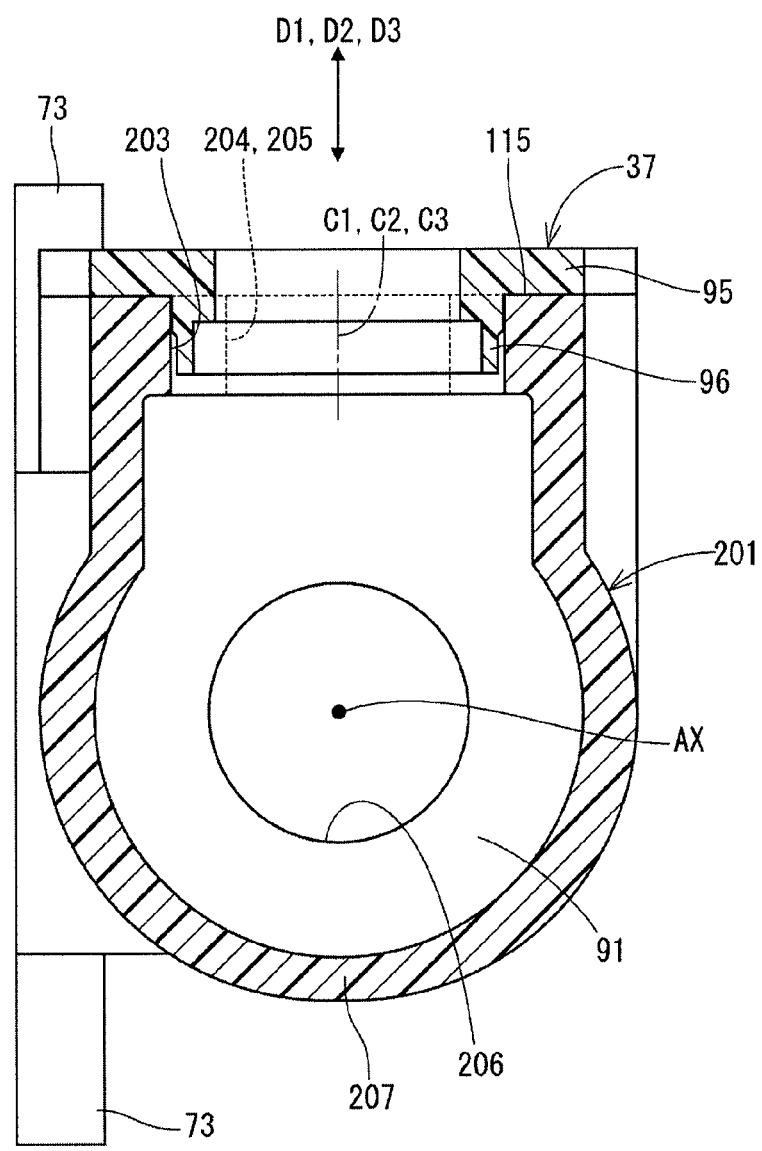
FIG. 15 is a sectional view taken along a XV-XV line of FIG. 13 and showing the housing and a holding plate.

The housing 201 includes three input ports 203, 204, 205 and an output port 206. Cooling water flows into the housing 201 through the input ports 203, 204, 205. The input ports 203, 204, 205 are placed on same positions and have same forms as those of the output ports 77, 78, 79 in the first embodiment. As shown in FIG. 15, any one of the input ports 203, 204, 205 is overlapped with at least partially with at least one of the other input ports 203, 204, 205 in the circumferential direction when viewed in the axial direction, that is, the direction parallel to the central axis AX. That is, at least a part of one input port is overlapped with all of the other output ports when viewed in the axial direction. For example, the input port 203 is overlapped with the input ports 204, 205.

Figure 16:
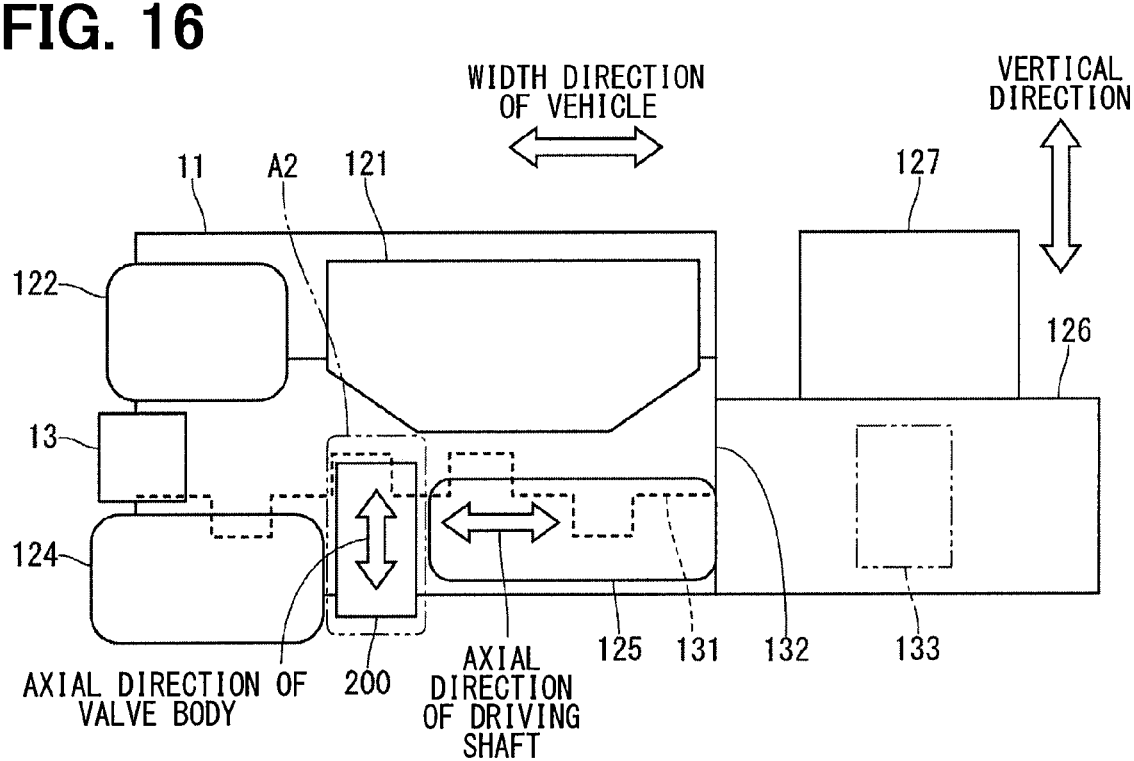
FIG. 16 is a schematic view showing an engine and a peripheral equipment shown in FIG. 12 viewed from the front of the vehicle.

Therefore, similarly to the first embodiment, the cooling water control valve 200 is enabled to be thinner and located in a small space in the third embodiment. As shown in FIG. 16, the cooling water control valve 200 is provided in a small space A2 which is located close to the water pump 13 and between the compressor 124 and the starter 125. The cooling water control valve 200 is placed such that the valve body shaft direction is substantially orthogonal to the drive shaft direction in order to enable the cooling water control valve 200 to be placed in the small space A2.

As shown in FIGS. 13 and 14, the housing 201 includes the output port 206 and an outlet pipe 209. The output port 206 is provided to an end part 208 which is placed opposite to the driving unit 31 in the axial direction in a housing main body 207. The outlet pipe 209 is fixed to the end part 208. The output port 206 is communicated to the internal space 75 regardless of the rotational position of the valve body 33. Correspondingly to the rotational position of the valve body 33, the output port 206 is communicated selectively with the input ports 203, 204, 205, or the valve body 33 closes the passages between the output port 206 and the input ports 203, 204, 205.

In this way, the relationship between the input port and the output port may be opposite to that in the first embodiment. In addition, the output port 206 is not required to be perpendicular to the axial direction of the valve body 33. Therefore, a layout of pipes which are connected to the output port 206 may be chosen suitably and the piping layout is enhanced in flexibility. The output port 206 is provided in the housing 201 at a position which resides along the axial direction of the valve body 33. This decreases a number of bent parts in pathways for cooling water from the input ports 203, 204, 205 to the output port 206. This is configured to decrease a flow resistance against water.

The pipe member 202 includes pipes 211, 212, 213. As shown in FIG. 13, each pipe 211, 212, 213 is placed on a cross section which includes the central axis AX and passes the input ports 203, 204, 205. The pipe member 202 is placed within a width of the housing 201. Therefore, the cooling water control valve 200 is enabled to be as thin as possible.

Fourth Embodiment

Figure 17:
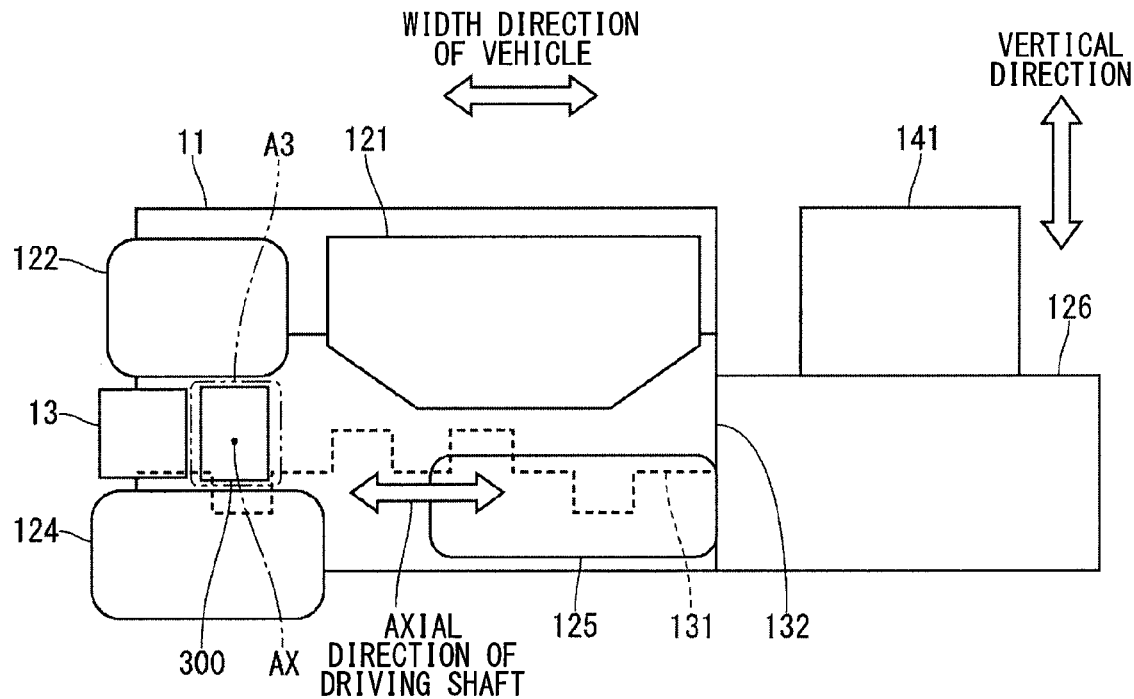
FIG. 17 is a schematic view showing an engine and a peripheral equipment viewed from the front of the vehicle according to a fourth embodiment.

In a fourth embodiment, as shown in FIG. 17, a cooling water control valve 300 is placed in a small space A3 which is located close to the water pump 13 and between the alternator 122 and the compressor 124. The cooling water control valve 300 is placed such that the valve body shaft direction is substantially orthogonal to the drive shaft direction to be located in the small space A3. The cooling water control valve 10 is configured to be placed in a small space not only between the engine 11 and the power converter, but also between other equipment around the engine 11.

Other Embodiment

In other embodiments, the cooling system applying the cooling water control valve is not limited to those shown in FIG. 1 or FIG. 12. Equipment in the circulation routes may be appropriately changed. For example, the power converter or the like may be added to the circulation routes. The circulation routes may include 2 routes or more than 4 routes. Accordingly, a number of ports which is closed corresponding to the rotational position of the valve body may be 2 or more then 4. In another embodiment, the cooling water control valve is configured to be placed in a small space not only between the engine and the power converter, but also between other equipment, such as the battery or the like, and the engine. In another embodiment, the cooling water control valve may be attached not to the engine but to the power converter in a case where the cooling water control valve is provided between the engine and the power converter.

In another embodiment, at least a part of one port of multiple ports which are closed corresponding to the rotational position of the valve body may be overlapped at least partially with one of other output ports when viewed in the axial direction. This enables to concentrate the multiple ports on one part of the housing in the rotating direction, and enables the cooling water control valve to be thinner. In another embodiment, the opening directions of the multiple ports in which the seal units are assembled may not be parallel to each other. As long as the multiple ports are concentrated on one part of the housing in the rotating direction, the seal units are enabled to be assembled without rotating the housing even in such a case.

In another embodiment, the holding plate may be integrally formed with the multiple pipes. In another embodiment, the driving unit may be of another type. That is, a driving unit of another known type may be used as long as the driving unit outputs a rotary power. In another embodiment, the shaft and the cylinder part of the valve body may be separate components. The multiple annular portions of the cylinder part may be separate components. The present disclosure has been described according to the present embodiments. However, the present disclosure is not limited by the embodiments or structure. The present disclosure encompasses various variations and modifications within equivalents. This present disclosure also encompasses various combinations and embodiments, and furthermore, encompasses one or more or less of elements and combinations thereof.

The invention claimed is:

1. A valve device for a vehicle and configured to control a flow amount of a cooling medium of an engine, wherein
the vehicle is a hybrid vehicle including an engine and a motor, the vehicle further including a transmission and a power converter that is configured to control a current flowing to the motor,
the transmission is assembled on a lower portion of a side wall of the engine and is connected to a driving shaft of the engine,
the power converter is provided to an upper side of the transmission and is provided at a location opposed to an upper portion of the side wall of the engine in a direction of the driving shaft, and
the engine and the power converter form a small space therebetween, such that a length of the small space between the engine and the power converter in a direction in which the engine is opposed to the power converter is smaller than a length of the small space in a direction along the side wall of the engine,
the valve device comprising:
a housing including a plurality of ports; and
a valve body enabled to rotate about a central axis in the housing and includes a plurality of openings located at different positions in an axial direction and configured to communicate the ports, respectively, and that changes a communication degree between the opening and the port according to a rotational position, wherein
the valve device is placed in the small space such that an axial direction of the valve body is substantially orthogonal to an axial direction of the driving shaft.

2. The valve device according to claim 1, wherein
the power converter is used for a power source different from the engine.

3. The valve device according to claim 1, wherein
the engine is placed such that the axial direction of the driving shaft of the engine is parallel to a width direction of the vehicle.

4. The valve device according to claim 1, wherein
the valve device is placed to overlap a projection of the valve device in a vertical direction and a projection of a transmission assembled on the engine in the vertical direction.

5. The valve device according to claim 1, wherein
the valve device is placed between the engine and an equipment, and
the axial direction of the valve body is different from a direction in which the engine is opposed to the equipment.

6. The valve device according to claim 1, wherein
the valve device is placed between an alternator and a compressor.

7. The valve device according to claim 1, further comprising:
a driving unit configured to output a rotary power to the valve body, wherein
a gear that is a part of a reduction gear of the driving unit is placed on an axis of the valve body.

8. The valve device according to claim 1, further comprising:
a rotation angle sensor configured to detect a rotation angle of the valve body, wherein
the rotation angle sensor is placed on an axis of the valve body.

9. The valve device according to claim 1, wherein
one end of the housing is placed lower than an upper end of the engine in vertical direction.

10. The valve device according to claim 1, wherein
the port is an output port configured to guide the cooling medium to flow from an inside of the housing to an outside of the housing, and
the housing further includes an input port configured to guide the cooling medium to flow from the outside of the housing into the housing.

11. The valve device according to claim 10, wherein
the input port penetrates the housing on a side at which the housing is attached to the engine, and is connected to an outlet of a water jacket by attachment of the housing to the engine.

12. The valve device according to claim 1, wherein
the port is an input port configured to guide the cooling medium to flow from the outside of the housing into the housing, and
the housing further includes an output port to guide the cooling medium to flow from the inside of the housing to the outside of the housing.

13. A cooling system comprising:
the engine; and
the valve device according to claim 1.

14. The valve device according to claim 1, wherein
the axial direction of the valve body is substantially orthogonal to the axial direction of the driving shaft of the engine such that the axial direction of the valve body intersects the axial direction of the driving shaft of the engine at an intersection angle between 80° and 100°.

15. The valve device according to claim 1, wherein
the valve device is placed such that the axial direction of the valve body is substantially orthogonal to the axial direction of a driving shaft of the engine in a state where the valve device is located in the vehicle with the engine.

16. The valve device according to claim 1, wherein the driving shaft of the engine is a crankshaft.

17. The valve device according to claim 1, wherein
a width of the housing in a width direction of the housing is smaller than a length of the housing in an axial direction of the housing.

18. The valve device according to claim 17, wherein
the valve device is placed such that the width direction of the housing coincides with the direction in which the engine is opposed to the power converter.

19. The valve device according to claim 18, wherein
the valve device is placed such that the axial direction of the housing coincides with the direction along the side wall of the engine.

20. A cooling system comprising:
the engine;
the motor;
the transmission;
the power converter; and
the valve device according to claim 1.

* * * * *